United States Patent [19]

Freitag et al.

[11] 4,269,964
[45] May 26, 1981

[54] POLYCARBONATES WITH ALKYLPHENYL END GROUPS, THEIR PREPARATION AND THEIR USE

[75] Inventors: Dieter Freitag; Werner Nouvertné; Claus Burkhardt, all of Krefeld; Frank Kleiner, Cologne, all of Fed. Rep. of Germany

[73] Assignee: Bayer Aktiengesellschaft, Leverkusen, Fed. Rep. of Germany

[21] Appl. No.: 75,439

[22] Filed: Sep. 14, 1979

[30] Foreign Application Priority Data

Sep. 27, 1978 [DE] Fed. Rep. of Germany ....... 2842005

[51] Int. Cl.$^3$ .............................................. C08G 8/28
[52] U.S. Cl. .................................... 528/126; 528/128; 528/171; 528/174; 528/196; 528/198; 528/204
[58] Field of Search ............... 528/126, 128, 171, 174, 528/196, 198, 204

[56] References Cited

U.S. PATENT DOCUMENTS

| 3,080,342 | 3/1963 | Lee et al. .............................. 528/196 |
| 3,177,179 | 4/1965 | Lee et al. .............................. 528/196 |
| 3,214,405 | 10/1965 | Crowe .................................. 528/198 |
| 3,544,514 | 12/1970 | Schnell et al. ......................... 260/47 |
| 3,897,392 | 7/1975 | Haupt et al. ..................... 260/47 XA |
| 3,931,108 | 1/1976 | Binsack et al. ................. 260/47 XA |
| 4,001,183 | 1/1977 | Freitag et al. ....................... 528/196 |
| 4,174,437 | 11/1979 | Idel et al. ............................. 528/199 |
| 4,185,009 | 1/1980 | Idel et al. ........................ 260/45.9 R |
| 4,196,276 | 4/1980 | Schreckenberg et al. .......... 528/196 |

OTHER PUBLICATIONS

Japanese Laid-Open Specification No. 34,992/76.

Primary Examiner—Hosea E. Taylor
Assistant Examiner—Amelia B. Yarbrough
Attorney, Agent, or Firm—Gene Harsh; Lawrence S. Pope; Aron Preis

[57] ABSTRACT

This development is concerned with aromatic thermoplastic polycarbonates with special chain terminators which give the polymers enhanced hydrolysis resistance and impact toughness. These chain terminators are alkyl substituted monohydroxy phenyls in which each phenyl is substituted by one alkyl group having 8 or 9 carbon atoms and about 47 to 89% of its hydrogen atoms trisubstituted on carbon atoms with up to about 20% of the substituents in the ortho position and the balance at the para position. This development is also concerned with a process for synthesizing such polymers by using such chain terminators as reactants in generically known synthesis methods for polycarbonates.

14 Claims, No Drawings

POLYCARBONATES WITH ALKYLPHENYL END GROUPS, THEIR PREPARATION AND THEIR USE

SUMMARY OF THE INVENTION

The present invention relates to thermoplastic aromatic polycarbonates with molecular weights $\overline{M}w$ (weight average) of at least about 10,000 in particular of about 10,000 to 200,000 and preferably of about 20,000 to 80,000, which are based on diphenols, phenolic chain stoppers of the formula

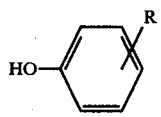

and, if desired, branching agents, which are characterized in that R represents a branched alkyl radical consisting of 8 and/or 9 C atoms, and, in the alkyl radical R, the proportion of $CH_3$ protons is between about 47% and 89% and the proportion of the sum of the CH and $CH_2$ protons is between about 53% and 11%, and wherein R can be in the o-position and/or p-position relative to the OH group, the upper limit of the ortho proportion being about 20%.

The present invention also relates to a process for the preparation of the thermoplastic aromatic polycarbonates according to the invention, with a $\overline{M}w$ of at least about 10,000, in particular about 10,000 to 200,000 and preferably about 20,000 to 80,000, which is characterized in that diphenols, preferably those of the formula II

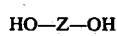

HO—Z—OH        II wherein

Z is a divalent aromatic radical with preferably 6 to 30 C atoms, if desired branching agents and about 0.1–8 mol %, preferably about 0.1–5 mol %, relative to the mols of diphenols, of phenolic chain stoppers of the formula I are reacted by the phase boundary process.

The present invention also relates to thermoplastic aromatic polycarbonates obtainable by the process according to the invention.

BACKGROUND OF THE INVENTION

In comparison with the polycarbonates customarily prepared with phenol, 2,6-dimethylphenol and p-tert.-butylphenol, as a chain regulator, the polycarbonates according to the invention exhibit a substantially increased resistance to hydrolysis and an improved critical width, the mechanical and thermal properties being otherwise comparable.

Compared with the polycarbonates of Japanese Laid-Open Specification No. 34,992/76, in which, inter alia, p-nonphenol is employed as a chain stopper for the preparation of polycarbonates (see Example 5 of Japanese Laid-Open Specification No. 34,992/76), the polycarbonates according to the invention exhibit no lowering of the heat distortion point, which could not be foreseen. (See the heat distortion point values in Japanese Laid-Open Specification 34,992/76: for Comparison Example 1, with p-tert.-butylphenol as the chain stopper = 135° C., and for Example 5, with p-nonylphenol as the chain stopper = 128° C.; and see also the Vicat B temperature for Comparison Examples 3 and 5 of the present patent application).

The polycarbonates of Japanese Laid-Open Specification 34,992/76 moreover exhibit no improvements in the resistance to hydrolysis and in the critical width compared with conventional polycarbonates prepared with phenol as a chain stopper. (See Comparison Examples 4 and 5 of the present patent application).

DETAILED DESCRIPTION OF THE INVENTION

The alkylphenols of the formula I to be employed according to the invention as chain stoppers are inexpensive and are available as commercial products. They can be prepared, as described in Journ. Am. Chem. Soc. 56, 1,583-6 (1934), by alkylating phenol with the corresponding halide or by alkylating phenol with the corresponding olefin. By this process, it is possible, for example, to prepare 4-(1,3-tetramethyl-butyl)-phenol in very good yields by reacting isobutylene with phenol in the presence of concentrated sulphuric acid or by reacting phenol with isobutyl chloride in the presence of potassium hydroxide.

By diphenols of the formula II which preferably contain 6 to 30 C atoms there are to be understood both mononuclear and polynuclear diphenols, which can contain hetero-atoms and can be substituted. The following diphenols are suitable: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and $\alpha\alpha'$-bis-(hydroxyphenyl)-diisopropylbenzenes, and their nuclear-alkylated and nuclear-halogenated compounds. These and other suitable diphenols are described, for example, in U.S. Pat. Nos. 3,028,365; 2,999,835; 3,148,172; 3,271,368; 2,991,273; 3,271,367; 3,280,078; 3,014,891; and 2,999,846, all incorporated herein by reference in German Offenlegungsschriften Nos. (German Published Specifications) 1,570,703; 2,063,050; 2,036,052; and 2,211,956; French Patent Specification No. 1,561,518 and in the monograph H. Schnell, Chemistry and Physics of Polycarbonates, Interscience Publishers, New York, 1964.

Examples of preferred diphenols are: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, $\alpha\alpha'$-bis-(4-hlydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, $\alpha,\alpha'$-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Any desired mixtures of the above-mentioned diphenols can also be used.

Small amounts, preferably amounts between about 0.05 and 2.0 mol % (relative to diphenols employed) of compounds which are trifunctional or more than trifunctional, in particular those with three or more than three phenolic hydroxyl groups, can also be added for the purpose of improving the flow properties. Examples of some of the compounds with three or more than three phenolic hydroxyl groups which can be used are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-orthoterephthalic acid ester, tetra-(4-hydroxyphenyl)-methane, tetra-[4-(4-hydroxyphenyl-isopropyl)-phenoxy]-methane and 1,4-bis-[(4',4''-dihydroxy-triphenyl)-methyl]-benzene. Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

The polycarbonates according to the invention are preferably prepared by the phase boundary process (as described for instance in H. Schnell, *Chemistry and Physics of Polycarbonates*, Polymer Reviews, Volume IX, page 33 et seq., Interscience Publishers, (1964)).

In this process, the diphenols of the formula II are dissolved in an aqueous alkaline phase. The compounds of the formula I required for the preparation of the polycarbonates according to the invention are added to this solution in amounts of about 0.1 mol %–8 mol %, preferably about 0.1–5 mol %, relative to the mols of diphenols of the formula II, dissolved in an organic solvent. The reaction with phosgene is then carried out in the presence of an inert organic phase, which preferably dissolves polycarbonate, in accordance with the method of the phase boundary condensation. The reaction temperature is between about 0° C. and 40° C.

The about 0.05 to 2 mol %, relative to diphenols of the formula II, of branching agents also to be used if desired can be either initially introduced into the aqueous alkaline phase with the diphenols or added with the chain stoppers, dissolved in the organic solvent, before the phosgenation.

Instead of the diphenols of the formula II, it is furthermore also possible to use mono- and/or bis-chlorocarbonic acid esters thereof, these being added as solutions in organic solvents. The amount of chain stopper of the formula I and of branching agent then depends on the mols of structural units Z; if chlorocarbonic acid esters are employed, the amount of phosgene can also be correspondingly reduced in a known manner.

The chain stoppers of the formula I to be employed according to the invention can also be added during the phosgenation. Examples of suitable organic solvents for dissolving the chain stoppers of the formula I and, if appropriate, for the branching agents and the chlorocarbonic acid esters are methylene chloride, chlorobenzene, acetone, acetonitrile and mixtures of these solvents, in particular mixtures of methylene chloride and chlorobenzene.

Methylene chloride, chlorobenzene and mixtures of methylene chloride and chlorobenzene, for example, are used as the organic phase for the phase boundary polycondensation reaction.

The preparation of the polycarbonates according to the invention by the phase boundary process can be catalyzed in the customary manner by catalysts such as tertiary amines, in particular, tertiary aliphatic amines, such as tributylamine or triethylamine; the catalysts can be employed in amounts of about 0.05 to 10 mol %, relative to the mols of diphenols of the formula II or mols of structural units Z. The catalysts can be added before the start of the phosgenation, during the phosgenation or even after the phosgenation.

Isolation of the polycarbonates according to the invention is effected in a known manner.

Examples of compounds of the formula I which are suitable according to the invention are

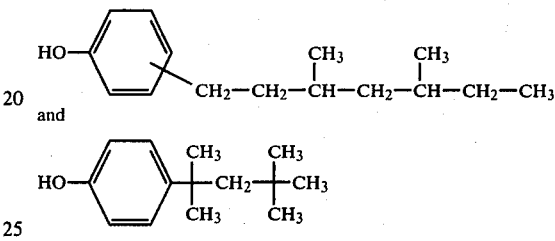

Either one compound of the formula I or mixtures of the compounds of the formula I with one another can be employed for the preparation of the polycarbonates according to the invention.

The aromatic polycarbonates according to the invention should as a rule have molecular weights $\overline{M}w$ (weight average) of at least about 10,000, in particular of about 10,000 to 200,000 and preferably of about 20,000 to 80,000. (Determined by gel chromatography, after prior calibration). They can contain antiageing agents which substantially increase the stability of the process products. For modification of the products according to the invention, it is possible to add substances such as, for example, carbon black, kieselguhr, kaolin, clays, $CaF_2$, $CaCO_3$, aluminum oxides, glass fibers and inorganic pigments, both as fillers and as nucleating agents. The products can also contain the mold-release agents customary for polycarbonate, such as, for example, glycerol tristearate. In the examples which follow, η rel. is measured in $CH_2Cl_2$ at 25° C. and at a concentration of 0.5% by weight.

EXAMPLE 1

3.42 kg of bisphenol A, dissolved in 6.67 kg of 45% strength sodium hydroxide solution and 37.7 kg of water, are initially introduced at 20° C. with 53 kg of methylene chloride. A solution of 123.6 g of 4-(1,3-tetramethyl-butyl)-phenol in 100 g of methylene chloride is added to the stirred mixture in the course of about 15 minutes, while stirring, and 2.23 kg of phosgene are then passed in at pH 13–14 and at 21°–25° C. in the course of 1 hour. Thereafter, 15.15 g of triethylamine are added and the mixture is stirred for a further 30'.

The bisphenolate-free aqueous phase is separated off, and, after acidifying with phosphoric acid, the organic phase is washed with water until neutral and freed from solvent. The polycarbonate had a relative solution viscosity $\eta_{rel.}$ of 1.288.

EXAMPLE 2

A polycarbonate was prepared with 4 mol % of a mixture consisting of 87% of 4-(3,5-dimethylheptyl)- phenol and 13% of 2-(3,5-dimethylheptyl)-phenol, as described in Example 1. $\eta_{rel.} = 1.284$.

COMPARISON EXAMPLES 3–5

Polycarbonates were prepared with the appropriate mol % of the following chain stoppers, as described in Example 1:

Example 3, with 4% of p-tert.-butylphenol: $\eta_{rel.} = 1.284$

Example 4, with 4% of phenol: $\eta_{rel.} = 1.285$

Example 5, with 4% of p-iso-dodecylphenol, $\eta_{rel.} = 1.280$

The hydrolysis values and the values for the critical width of the polycarbonates according to Examples 1–5 are found in Table 1.

TABLE 1

Resistance to hydrolysis and critical width of polycarbonates as a function of the nature of the chain stopper

|  |  | $\eta$ rel. | Vicat B according to DIN 55,460 °C. | Critical width (mm) | Hydrolysis test: Impact strength (according to DIN 53,453) (kJ/m²) after a residence time of 1,000 hours in boiling water - starting with 10 test pieces |
|---|---|---|---|---|---|
| Polycarbonate according to Example | 1 | 1.288 | 149 | 6.7–6.9 | 7 × unbroken |
|  | 2 | 1.284 | 146 | 7.0–7.3 | 8 × unbroken |
| Comparison Examples | 3 | 1.284 | 148 | 5.7–6.0 | 2 × unbroken |
|  | 4 | 1.285 | 147 | 5.3–5.4 | all broken |
|  | 5 | 1.280 | 138 | 4.1–4.3 | all broken |

+ The critical width is the width of a test piece below which the polycarbonate exhibits a sharp decrease in the Izod notched impact strength, measured in J/m in accordance with the method of ASTM 256-56.

What is claimed is:

1. A thermoplastic aromatic polycarbonate with a molecular weight $\overline{M}w$ (weight average) of about 10,000 to 200,000, which is based on at least one diphenol and, if appropriate, a branching agent, characterized in that it is also based on at least one phenolic chain stopper of the general formula

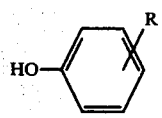

(I)

in which

R represents a branched alkyl radical consisting of 8 or 9 C atoms, and, in the alkyl radical, the proportion of $CH_3$ protons is between about 47% and 89% and the proportion of the sum of the CH and $CH_2$ protons is between about 53% and 11%, and wherein R can be in the o-position or p-position relative to the OH group, the upper limit of the ortho proportion being about 20%.

2. A polycarbonate according to claim 1 characterized by a molecular weight $\overline{M}w$ of about 20,000 to 80,000.

3. A polycarbonate according to claim 1, characterized in that it is based on a diphenol of the general formula

HO—Z—OH (II)

in which

Z represents a divalent mononuclear or polynuclear aromatic radical, containing 6 to 30 carbon atoms.

4. A polycarbonate according to claim 3 characterized in that the diphenol is selected from hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides bis-(hydroxyphenyl) sulphones and $\alpha,\alpha'$-bis-(hydroxyphenyl)-diisopropylbenzenes, and their nuclear-alkylated and nuclear-halogenated compounds.

5. A polycarbonate according to any of claims 1, 2 or 3 characterized in that it is based on, as a branching agent, a compound containing 3 or more functional groups in the molecule, the said compound being present in an amount of about 0.05 to 2 mol percent, relative to the content of diphenol.

6. A polycarbonate according to any of claims 1, 2 or 3, characterized in that the chain stopper is selected from 2-(3,5-dimethylheptyl)-phenol, 4-(3,5-dimethylheptyl)-phenol, 4-(1,1,3,3-tetramethyl-butyl)-phenol and mixtures thereof.

7. In the phase boundary process for the preparation of a thermoplastic aromatic polycarbonate with a molecular weight $\overline{M}w$ of at least about 10,000 the improvement wherein at least one diphenol, optionally a branching agent and about 0.1 mol % to 8 mol %, relative to the amount of diphenol, of a phenolic chain stopper of the formula (I), given in claim 1, are reacted.

8. A process according to claim 7, characterized in that the diphenol is employed in the form of a mono- and/or bis-chlorocarbonic acid ester thereof.

9. A process according to claim 7 or 8, characterized in that the reaction is effected at from about 0° to 40° C.

10. A process according to claim 7 or 8, characterized in that the organic phase of the reaction medium is methylene chloride, chlorobenzene or a mixture thereof.

11. A process according to claim 7 or 8, characterized in that the reaction is effected in the presence, as a catalyst, of a tertiary amine.

12. A process according to claim 11, characterized in that the catalyst is employed in an amount of about 0.05 to 10 mol % relative to the amount of diphenol.

13. A process according to claim 7 or 8, characterized in that about 0.1 to 5 mol % of phenolic chain stopper is employed, relative to the amount of diphenol.

14. A polycarbonate prepared by the process of claim 7 or 8.

* * * * *